United States Patent
Crall et al.

(10) Patent No.: US 7,108,418 B2
(45) Date of Patent: Sep. 19, 2006

(54) BEARING SEAL ASSEMBLY FOR CONCRETE AUGER MIXER AND METHOD FOR USING SAME

(75) Inventors: David M. Crall, Albia, IA (US); Max W. Gilmore, Indianola, IA (US); Leland W. Goode, Indianola, IA (US); Gary L. Ruble, Indianola, IA (US); Larry G. Lepper, Indianola, IA (US)

(73) Assignee: Cemen Tech, Inc., Indianola, IA (US)

( * ) Notice: Subject to any disclaimer, the term of this patent is extended or adjusted under 35 U.S.C. 154(b) by 170 days.

(21) Appl. No.: 10/780,327

(22) Filed: Feb. 17, 2004

(65) Prior Publication Data

US 2005/0180259 A1 Aug. 18, 2005

(51) Int. Cl.
*B28C 5/14* (2006.01)

(52) U.S. Cl. .................. 366/64; 366/318; 366/331; 277/381

(58) Field of Classification Search .................. 366/50, 366/64, 66, 67, 99, 318, 331; 277/380, 381
See application file for complete search history.

(56) References Cited

U.S. PATENT DOCUMENTS

| | | | | |
|---|---|---|---|---|
| 264,861 A | * | 9/1882 | Caldwell | 366/40 |
| 528,050 A | * | 10/1894 | Westerman | 384/140 |
| 3,199,795 A | * | 8/1965 | Bennett et al. | 366/331 |
| 3,450,392 A | * | 6/1969 | Vincent | 366/64 |
| 3,542,377 A | * | 11/1970 | Voitik | 277/380 |
| 4,087,100 A | * | 5/1978 | Yoshihashi et al. | 277/399 |
| 4,421,327 A | * | 12/1983 | Morley et al. | 277/381 |
| 4,732,396 A | * | 3/1988 | Brigham et al. | 277/306 |
| 5,048,847 A | * | 9/1991 | Kovacs et al. | 277/318 |
| 5,580,170 A | * | 12/1996 | Holley et al. | 366/325.1 |
| 6,086,069 A | * | 7/2000 | Bedford | 277/380 |
| 6,270,247 B1 | * | 8/2001 | Tschopp | 366/289 |

* cited by examiner

*Primary Examiner*—David Sorkin
(74) *Attorney, Agent, or Firm*—McKee, Voorhees & Sease, P.L.C.

(57) ABSTRACT

An auger mixer for mixing a concrete mix includes an elongated mixer housing having a mixing chamber for mixing the concrete mix therein. A mixing auger is rotatably mounted within the mixing chamber. A bearing assembly mounts one end of the auger shaft to the mixer housing. A seal assembly comprising a stationary seal remains stationary relative to the mixer housing and a rotating seal rotates with the auger. The stationary seal and the rotating seal contact one another to create a seal preventing the concrete mix from exiting the mixing chamber and moving toward the bearing assembly.

6 Claims, 3 Drawing Sheets

BEARING SEAL ASSEMBLY FOR CONCRETE AUGER MIXER AND METHOD FOR USING SAME

BACKGROUND OF THE INVENTION

The present invention relates to a bearing seal assembly for a concrete auger mixer.

Concrete auger mixers have been utilized to mix concrete in a continuous process. They include an elongated housing having a rotating auger therein. The housing usually has a flexible bottom and a rigid top and is arcuate at least in the bottom portion to conform to the flightings on the auger.

The auger housing is usually elevated at the discharge end and is lowered at the input end so that the concrete ingredients are placed within the housing at the lower end and is raised by the auger and mixed as it approaches the discharge opening at the upper end of the auger.

Problems have been encountered in providing a satisfactory seal of the lower end of the auger to the lower end of the auger housing. The auger rotates within the lower end wall of the auger housing and the cementations materials and water directed downwardly by gravity seep into the bearing and ultimately damage the bearing because of the abrasive nature of the cementatious material.

It is therefore desirable to provide an improved seal preventing the cementatious material from entering the bearing from within the auger housing.

Therefore a primary object of the present invention is the provision of an improved bearing seal for concrete auger mixers.

A further object of the present invention is the provision of a bearing seal for a concrete auger mixer that utilizes a stationary seal and a rotating seal which engage one another and provide a seal therebetween.

A further object of the present invention is the provision of a stationary seal that remains stationary relative to the end wall of the housing mixer and a rotating seal that rotates with the auger, the two seals engaging one another and providing a seal to prevent cementations material from exiting the mixing housing chamber.

A further object of the present invention is the provision of a seal comprising a fixed sealing member and a fixed flexible member, and providing a rotating sealing member and a rotating flexible member. The fixed sealing member and the rotating sealing member include sealing surfaces that engage one another and prevent cementatious material from exiting the auger housing.

A further object of the present invention is the provision of a flexible plate outside the lower housing wall which permits a slight movement of the angle of the auger relative to the mixer housing wall so as to permit slight flexing thereof.

A further object of the present invention is the provision of a bearing for permitting the rotation of the auger relative of the end wall of the mixer, the seal being provided between the bearing and the cementatious material.

A further object of the present invention is the provision of a seal and bearing for a concrete auger mixer which is economical to manufacture, durable in use, and efficient in operation.

A further object of the present invention is the provision of a method for sealing the cementatious material within the mixer housing during rotation of the auger.

A further object of the present invention is the provision of a bearing which utilizes lapped surfaces for engaging one another to cause the seal.

SUMMARY OF THE INVENTION

The foregoing objects may be achieved with an auger mixer for mixing a concrete mix comprising an elongated mixer housing having a first end and a second end. The mixer housing has a mixing chamber for mixing the concrete mix therein. A mixing auger is disposed within the mixing chamber and has an auger shaft. The auger shaft has a longitudinal shaft axis extending from the first end to the second end of the mixer housing. A power source is connected to the mixing auger for rotating the mixing auger about the longitudinal shaft axis of the shaft. The mixer housing has a first end wall adjacent the first end of the housing. A bearing assembly mounts one end of the auger shaft to the first end wall of the housing for rotation relative to the first end wall about the shaft axis. A seal assembly comprises a stationary seal remaining stationary relative to the first end wall and a rotating seal rotating about the auger shaft axis. The stationary seal and the rotating seal contact one another to create a seal preventing the concrete mix from exiting the mixing chamber and moving toward the bearing assembly.

According to another feature of the present invention the fixed seal comprises a first fixed seal member and a second fixed seal member. The rotating seal comprises a first rotating seal member and a second rotating seal member.

According to another feature of the present invention the first fixed seal member and the first rotating seal member are made of a resilient material deformed to engage and urge the second fixed member and the second rotating member respectively into frictional engagement with one another to create the seal.

According to another feature of the present invention the first fixed and rotating seal members are made of rubber and the second fixed and rotating seal members are made of steel.

According to another feature of the present invention the stationary seal comprises a sealing surface and the rotating seal comprises a sealing surface frictionally engaging and sealing against the sealing surface of the stationary seal.

According to another feature of the present invention the sealing surfaces of the stationary seal and the rotating seal are comprised of steel.

According to another feature of the present invention the sealing surfaces of the stationary seal and the rotating seal are circular.

According to another feature of the present invention the sealing surfaces of the stationary seal and the rotating seal are cone shaped and have outer circular cone ends. The cone shaped sealing surfaces of the stationary and rotating seals are oppositely opposed to one another so that only the outer circular cone ends contact one another.

According to another feature of the present invention a flexible stationary seal member and a flexible rotating seal member engage the stationary sealing surface and the rotating sealing surface respectively and bias the stationary sealing surface and the rotating sealing surface toward one another.

According to another feature of the present invention a steel plate attaches the bearing assembly to the first end wall of the housing. A compressible plate is between the steel plate and the first end wall. A securing member secures the steel plate and the compressible plate to the first end wall whereby the compressible plate permits flexing of the steel plate and the first end wall relative to one another so as to permit slight movement of the angular disposition of the shaft axis relative to the end wall.

According to the method of the present invention a seal assembly is placed between the first end wall and the rotating shaft. The seal assembly comprises a stationary seal and a rotating seal. The method includes maintaining the stationary seal stationary with respect to the first end wall and rotating the rotating seal about the rotating axis of the rotating auger shaft. The stationary seal and the rotating seal are frictionally contacted to provide a sealing engagement therebetween for preventing concrete mix from exiting the mixing chamber through the first end wall.

According to another feature of the method of the present invention a stationary seal having a circular stationary sealing surface and a rotating seal having a circular rotating sealing surface contact one another.

According to another feature of the present invention the circular rotating surface and the circular stationary surface are biased in frictional engagement with one another.

DETAILED DESCRIPTION OF THE PREFERRED EMBODIMENT

Figure 1:
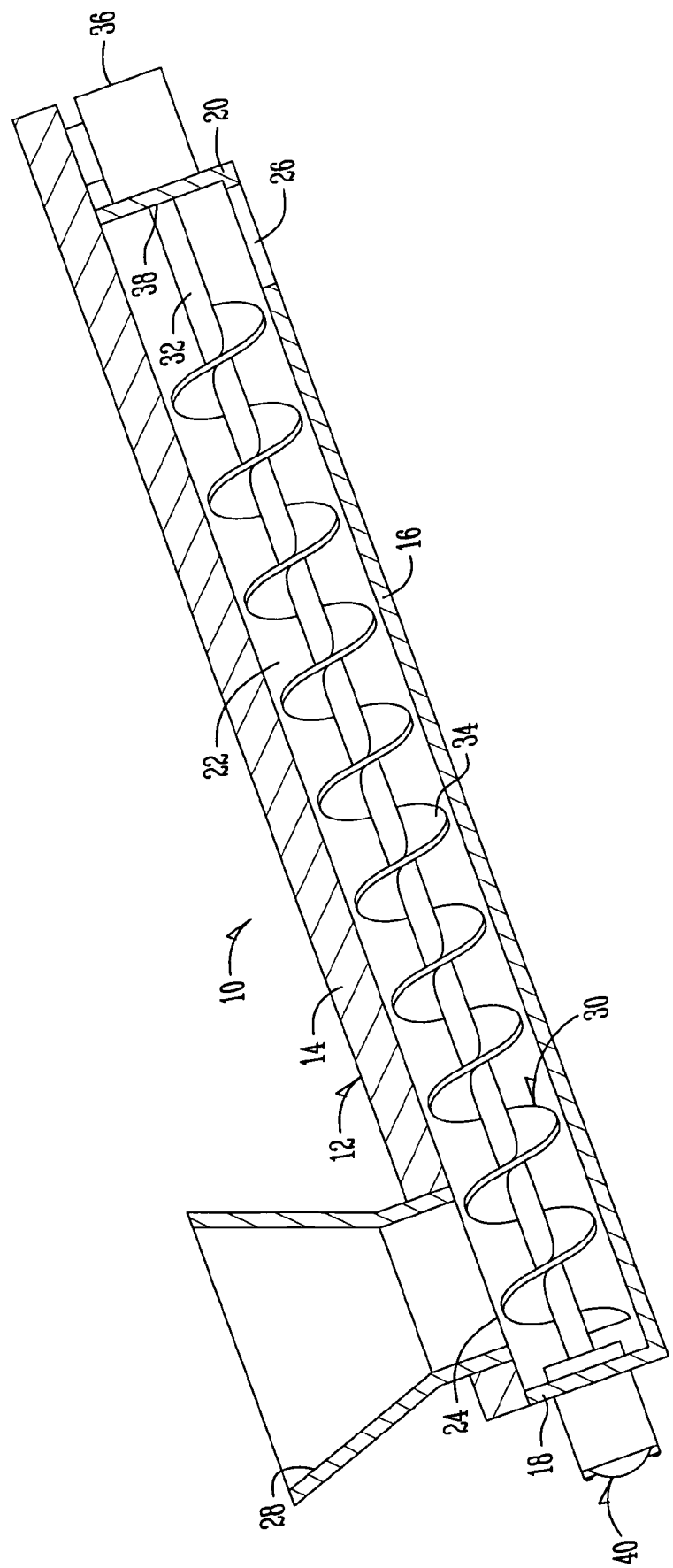
FIG. 1 is a sectional view of an auger mixer of the present invention.

Referring to FIG. 1, a concrete auger mixer 10 embodying the present invention is shown. Mixer 10 includes a mixer housing 12 having a rigid upper member 14 and a flexible lower member 16. A first end wall 18 and a second end wall 20 together with the upper member 14 and the flexible lower member 16 form a mixing chamber 22 in which concrete is to be mixed. The mixing chamber 22 includes an inlet opening 24 adjacent the lower end wall 18 and a discharge opening 26 adjacent the upper end wall 20. A hopper 28 is provided for dropping the concrete mix into the lower end of the auger mixer 10. The concrete mix may vary, but usually includes cement, aggregate, water, and possibly other ingredients such as pigments.

Rotatably mounted within the mixing chamber 22 is an auger 30 having an auger shaft 32 and auger flightings 34. The auger shaft 32 is adapted to rotate about its longitudinal axis 32. A motor 36 is attached to the upper end of the auger shaft 32. A motor bearing 38 (not shown) provides the rotation of shaft 32 in the end wall 20 as it is rotated by motor 36. The bearing 38 does not encounter substantial pressure from the cementatious material within the housing 22 because it is located at the upper end of the mixing auger 10.

However, a bearing assembly 40 is used to mount the lower end of the auger shaft 32 to the lower end wall 18.

Figure 2:
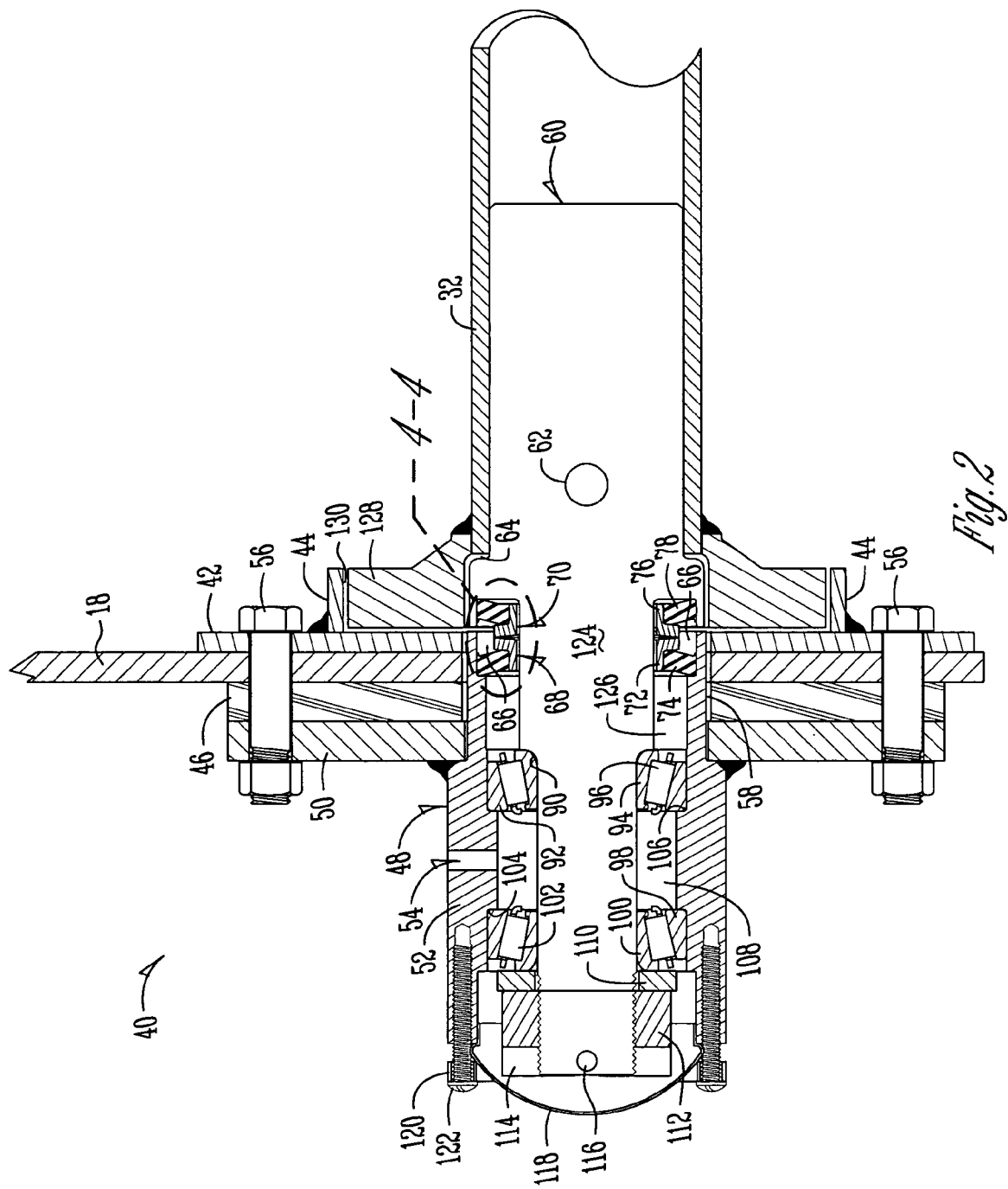
FIG. 2 is a sectional view of the bearing assembly of the present invention.

Referring to FIG. 2, a wear plate 42 is in facing engagement with the interior of lower end wall 18. Wear plate 42 includes an annular flange 44. On the opposite side of end wall 18 is a flexible plate 46 preferably made from rubber, but possibly made from other flexible material. A bearing housing 48 includes a housing plate 50 which is in facing engagement with the flexible plate 46 and holds the flexible plate 46 against the end wall 18. Bearing housing 48 also includes a housing cylinder 52 which includes a grease zerk 54 therein. Bolts 56 bolt the flexible plate 46 between the housing plate 50 and the end wall 18, and also bolt the wear plate 42 against the end wall 18. The end wall 18, the flexible plate 46, the housing plate 50, and the internal wearing plate 42 all include a circular opening therein which together form a clearance opening 58.

Mounted telescopically within the lower end of shaft 32 is a tail shaft 60 which is held in attachment to the auger shaft 32 by means of a connecting bolt 62. Thus tail shaft 60 rotates in unison with auger shaft 32.

Figure 3:
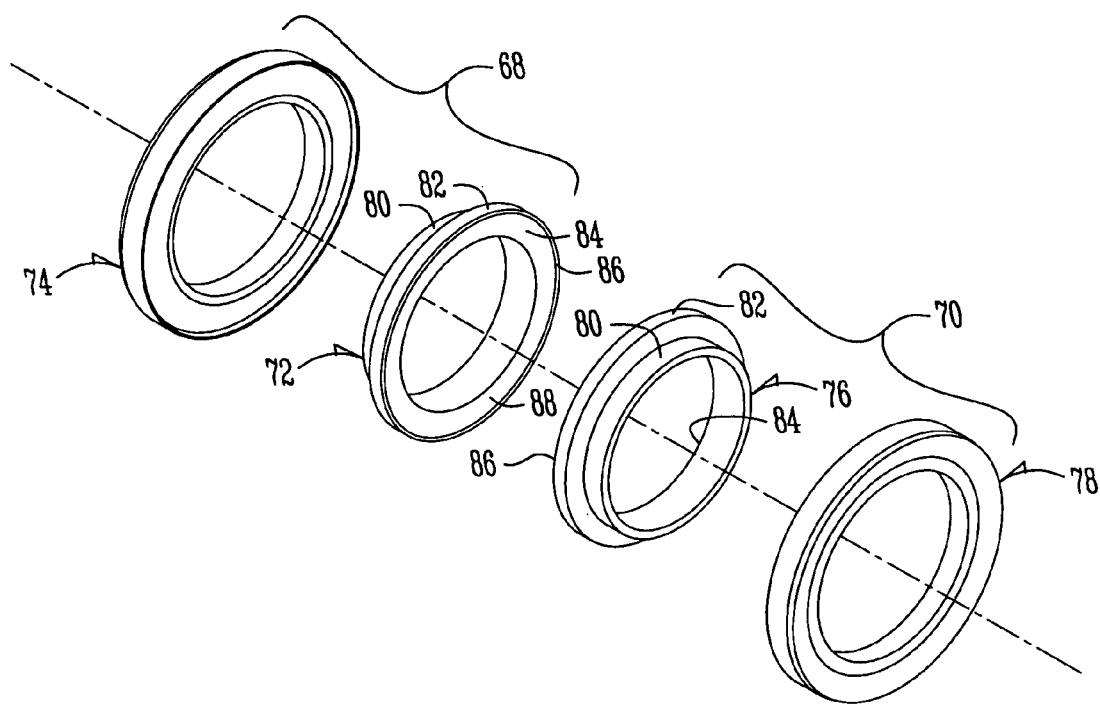
FIG. 3 is an exploded perspective view of the lapped seal members used in the present application.

Tail shaft 60 includes an internally facing shoulder 64. The term internally refers to facing in the direction of the mixing chamber 22. Tail shaft 60 and bearing housing 48 together create an annular seal cavity 66 which contains a stationary seal 68 and a rotating seal 70. Stationary seal 68 includes a stationary steel ring 72 (FIG. 4) and a stationary flexible ring 74. The rotating seal 70 includes a rotating steel ring 76 and a rotating flexible ring 78. Together the stationary seal 68 and the rotating seal 70 comprise a heavy duty seal manufactured by CR Services, 735 Tollgat Road, Elgin, Ill. 60123-9332 under the service kit number 16904. These seals are also referred to as "lapped seals". They are shown in greater detail in FIGS. 3 and 4. Stationary steel ring 72 includes a horizontal ring 80 and a vertical ring 82. The vertical ring 82 has a cone shaped surface 84 thereon. Cone shaped surface 84 has an outer cone edge 86 which forms the outer peripheral edge of a tapered seal surface 88.

Figure 4:
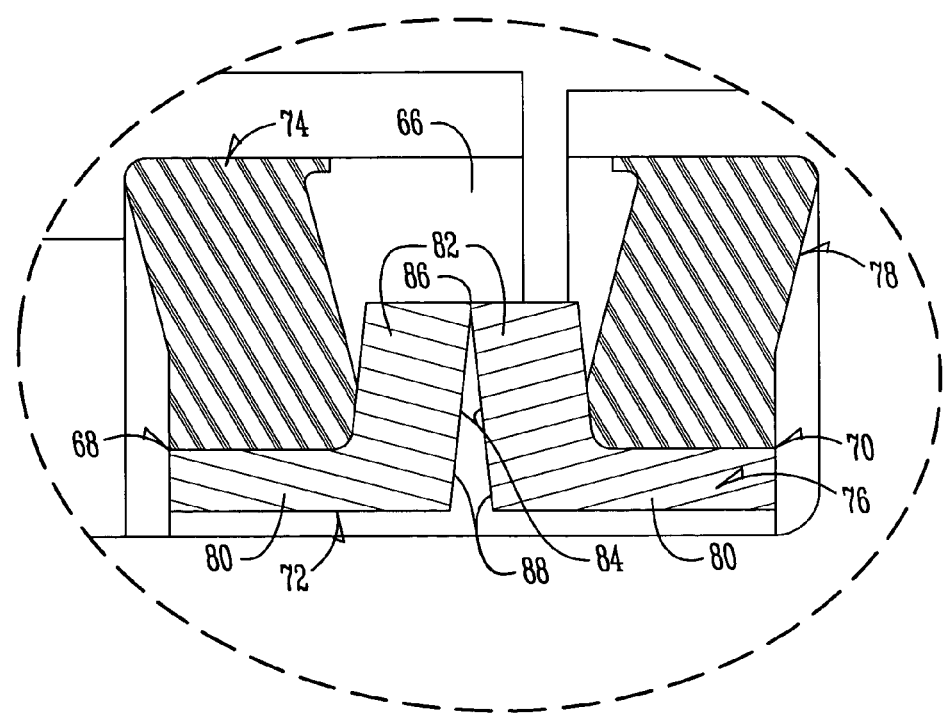
FIG. 4 is an enlarged detailed sectional view taken along line 4—4 of FIG. 2.

The rotating steel ring 76 is similarly constructed and includes a horizontal ring 80, a vertical ring 82, a cone shaped surface 84, an outer cone edge 86, and a tapered seal surface 88. It should be noted that only the outer peripheral edges 86 of the two steel members 72, 76 engage one another around the entire periphery of the rings 72, 76. As the friction between the two causes wear of the tapered seal surface 88, the wear merely results in a flatter surface being formed between the steel members 72, 76. Flexible members 76, 78 are enclosed within seal cavity 66 and are distorted so that they are loaded and are angularly presented so that they force or bias the two steel members 72, 76 into engagement with one another as shown in FIG. 4. The lapped surface 86 provides a seal that prevents the cementatious material from entering between the two seal members 72, 76.

The tail shaft 60 also includes an outwardly facing shoulder 90 that faces away from the end wall 18. A bearing comprising an outer race 92, an inner race 94 and a tapered bearing 96 engages this outwardly facing shoulder 90. Similarly, a second bearing comprising an outer race 98, an inner race 100, and oppositely tapered bearings 102 is spaced outwardly from the first bearing member described. The bearing housing 48 includes an outwardly presented housing shoulder 104 and an inwardly presented housing shoulder 106 which engaged the bearings and hold them in place. The two bearings are spaced apart from one another by a bearing cavity 108. A spacer washer 110 surrounds the outwardly presented end of the tail shaft 60. A slotted nut 112 is threaded over the outer threaded end of tail shaft 60 and is further held in place by means of a cotter pin 116. In addition the slotted nut 112 includes slots 114 for receiving cotter pin 116 and has a hexagonal configuration for use of a wrench. A dust cap 118 is in covering relation over the nut 112 and is held in place by a securing ring 120 that includes bolts 122. Tail shaft 60 includes a shank portion 124 that forms an internal margin of a donut shaped cavity 108 that extends between the two bearings.

Grease is inserted through zerk 54 into the cavity 108 and then forced through bearing 96 into a donut shaped cavity 126, then between seal 68 and seal 70 into cavity 66 and continuing into cavity 130.

In operation, the motor 36 rotates the auger shaft 32 so as to cause the concrete mix to be moved upwardly from the inlet opening 24 towards the discharge opening 26. The rotation of the auger 32 and flightings 34 causes the concrete mix to be thoroughly mixed together before it is discharged from the discharge opening 26.

The concrete mix includes a slurry formed by the water in the mix, and this slurry drops by gravity toward the bearing assembly 40. It can enter between a lower end flange 128 through an L-shaped limited cavity 130. While the slurry can enter this cavity 130, larger particles such as aggregate are too large to enter the cavity 130. However, when the slurry reaches the sealed cavity 66 (FIG. 4), it is prevented from further infiltration into the bearing assembly 40 by the contact between the stationary seal 68 and the rotating seal 70. It should be noted that auger shaft 32, lower end flange 128, and rotating seal 70 rotate in unison together with the tail shaft 60 and the slotted nut 124.

The end wall 18, the plates 42, 46, 50, and the entire bearing housing 48 remain stationary as well as the stationary seal 68.

An important feature of the present invention is the frictional engagement between the rotating steel ring 76 and the stationary steel ring 72. These two rings engage one another at the outer cone edge 86. Through extended use, these surfaces will wear, but the angled nature of the sealing surfaces 84 take up the wear and prevent the seal from losing its sealing capability. Thus the cementatious slurry that enters through limited cavity 130 never progresses beyond the seal cavity 66. This cementatious material is also trapped between the two flexible sealing members 74, 78.

The bearings 96, 102 also are protected from the cementatious slurry material, and therefore their wear in response to the abrasive cementatious slurry is minimized.

The flexible plate 46 permits slight flexing of the auger shaft 32 with respect to the angle at which the tail shaft 60 passes through the wall opening 58. This provides tolerance for rotational movement of the shaft 32.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An auger mixer for mixing a concrete mix comprising:
    an elongated mixer housing having a first end and a second end, the mixer housing having a mixing chamber for mixing the concrete mix therein;
    a mixing auger disposed in the mixing chamber and having an auger shaft, the auger shaft having a longitudinal shaft axis extending from the first end to the second end of the mixer housing;
    a power source connected to the mixing auger for rotating the mixing auger about the longitudinal shaft axis of the shaft;
    the mixer housing having a first end wall adjacent the first end of the housing;
    a bearing assembly mounting one end of the auger shaft to the first end wall of the housing for rotation relative to the first end wall about the shaft axis;
    a seal assembly comprising a stationary seal remaining stationary relative to the first end wall and a rotating seal rotating in unison with the auger shaft when the auger shaft rotates about the auger shaft axis;
    the stationary seal including a stationary contact surface and a resilient stationary member;
    the rotating seal including a rotating contact surface and a resilient rotating member;
    the resilient stationary member and the resilient rotating member each being deformed and biasing the stationary seal and the rotating seal toward one another so that the stationary contact surface of the stationary member frictionally engages the rotating contact surface of the rotating member;
    the stationary contact surface and the rotating contact surface forming a seal there between during rotation of the rotating contact surface relative to the stationary contact surface to prevent the concrete mix from exiting the mixing chamber and moving toward the bearing assembly.

2. The auger mixer of claim 1 wherein the stationary and the rotating contact surfaces each comprise an outer edge of a cone shaped surface, the cone shaped surface of the stationary seal facing the cone shaped surface of the rotating seal.

3. The auger mixer according to claim 1 wherein the stationary and rotating contact surfaces of the stationary seal and the rotating seal are comprised of steel.

4. The auger mixer according to claim 3 wherein the contact surfaces of the stationary seal and the rotating seal are circular.

5. A method for sealing a rotating auger shaft relative to a first end wall of a concrete auger mixer, the auger mixer having a mixing chamber holding the auger shaft and containing a concrete mix, the method comprising:
    placing a seal assembly between the first end wall and the rotating shaft, the seal assembly comprising a stationary seal having a circular sealing surface and a rotating seal having a circular sealing surface;
    maintaining the stationary seal stationary with respect to the first end wall;
    rotating the rotating seal about the rotating axis of the rotating auger shaft;
    frictionally contacting the circular sealing surface of the stationary seal with the circular sealing surface of the rotating seal to provide a sealing engagement there between for preventing concrete mix from exiting the mixing chamber through the first end wall;
    biasing the circular sealing surface of the stationary seal toward the circular sealing surface of the rotating seal;
    rotating the rotating seal by rotating the auger mixer while at the same time maintaining the stationary seal against rotational movement whereby the circular sealing surface of the rotating seal rotates relative to, and bears against, the circular sealing surface of the stationary seal.

6. The method of claim 5 wherein the stationary seal includes a cone shaped surface and the circular sealing surface of the stationary seal is at the outer edge of the cone shaped surface, the rotating seal having a cone shaped surface and the circular sealing surface of the rotating seal being at the outer edge of the cone shaped surface; the method comprising facing the cone shaped surface of the stationary seal toward the cone shaped surface of the rotating seal and engaging the circular sealing surface of the stationary seal with the circular sealing surface of the rotating seal.

* * * * *